United States Patent
Ishii (10) Patent No.: US 11,048,468 B2
(45) Date of Patent: Jun. 29, 2021

(54) SOUND OUTPUT CONTROL METHOD AND DISPLAY SYSTEM

(71) Applicant: SEIKO EPSON CORPORATION, Tokyo (JP)

(72) Inventor: Naoki Ishii, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/856,181

(22) Filed: Apr. 23, 2020

(65) Prior Publication Data
US 2020/0341717 A1     Oct. 29, 2020

(30) Foreign Application Priority Data
Apr. 24, 2019   (JP) .............. JP2019-082685

(51) Int. Cl.
*G06F 3/16* (2006.01)
*G06F 1/16* (2006.01)
*H04N 9/31* (2006.01)

(52) U.S. Cl.
CPC .............. *G06F 3/16* (2013.01); *G06F 1/1605* (2013.01); *H04N 9/3105* (2013.01); *H04N 9/3147* (2013.01)

(58) Field of Classification Search
CPC ....... G06F 3/16; G06F 1/1605; H04N 9/3105; H04N 9/3147
See application file for complete search history.

(56) References Cited

U.S. PATENT DOCUMENTS

| 2011/0141380 | A1* | 6/2011 | Ichimasa | H04N 9/3197 349/5 |
| 2011/0221975 | A1* | 9/2011 | Kon | H04S 7/301 348/738 |
| 2014/0347497 | A1* | 11/2014 | Fukuchi | H04N 9/3147 348/180 |
| 2018/0013995 | A1 | 1/2018 | Mizushiro | |
| 2018/0227536 | A1* | 8/2018 | Takahashi | H04R 1/40 |

FOREIGN PATENT DOCUMENTS

| JP | 2018-005018 A | 1/2018 |
| WO | 2017/033574 A1 | 3/2017 |

* cited by examiner

*Primary Examiner* — Michael E Teitelbaum
(74) *Attorney, Agent, or Firm* — Oliff PLC (57) ABSTRACT

A sound output controlling method including a first projector that projects a first image on a projection surface via a first focusing lens and outputs sound based on a sound signal and a second projector that projects a second image on the projection surface via a second focusing lens and outputs sound based on the sound signal, causing the second projector to set the position of the second focusing lens based on the focused state of the second image on the projection surface and transmit position information on the position of the second focusing lens and causing the first projector to receive the position information, set the position of the first focusing lens based on the focused state of the first image on the projection surface, and control the output of the sound from the first projector based on the position information and the position of the first focusing lens.

6 Claims, 5 Drawing Sheets

SOUND OUTPUT CONTROL METHOD AND DISPLAY SYSTEM

The present application is based on, and claims priority from JP Application Serial Number 2019-082685, filed Apr. 24, 2019, the disclosure of which is hereby incorporated by reference herein in its entirety.

BACKGROUND

1. Technical Field

The present disclosure relates to a sound output control method and a display system.

2. Related Art

WO2017/033574 describes a technology for controlling the state of output of sound from a loudspeaker provided in each projector. In the technology, projection images projected from a plurality of projectors are first coupled to each other into a combined image on a projection surface, and a camera captures an image of the combined image. The positional relationship among the plurality of projectors is subsequently estimated based on the result of the capture of an image of the combined image. A loudspeaker of each of the projectors is allocated to any of a plurality of loudspeakers that form a surround system based on the result of the estimation.

According to the technology described in WO2017/033574, the positional relationship among the plurality of projectors is estimated based on the result of the capture of an image of the combined image, that is, based on a captured image representing the positional relationship among the projected images that form the combined image. The technology described in WO2017/033574 cannot therefore identify the distance from each of the projectors to the projection surface, and information on the distance from each of the projectors to the projection surface cannot be reflected in the control of the state of output of sound from each of the loudspeakers.

SUMMARY

A sound output controlling method according to the present disclosure is a sound output controlling method performed by a display system including a first projector that projects a first image on a projection surface via a first focusing lens and outputs sound based on a sound signal and a second projector that projects a second image on the projection surface via a second focusing lens and outputs sound based on the sound signal. The method includes causing the second projector to set a position of the second focusing lens based on a focused state of the second image on the projection surface, causing the second projector to transmit position information on the position of the second focusing lens, causing the first projector to receive the position information, causing the first projector to set a position of the first focusing lens based on a focused state of the first image on the projection surface, and causing the first projector to control the output of the sound from the first projector based on the position information and the position of the first focusing lens.

A display system according to the present disclosure includes a first projector and a second projector. The first projector includes a first focusing lens, a first projection section that projects a first image on a projection surface via the first focusing lens, a first loudspeaker that outputs sound based on a sound signal, and a first setting section that sets a position of the first focusing lens based on a focused state of the first image on the projection surface. The second projector includes a second focusing lens, a second projection section that projects a second image on the projection surface via the second focusing lens, a second loudspeaker that outputs sound based on the sound signal, a second setting section that sets a position of the second focusing lens based on a focused state of the second image on the projection surface, and a transmitter that transmits position information on the position of the second focusing lens. The first projector further includes a receiver that receives the position information and a sound control section that controls the output of the sound from the first loudspeaker based on the position information and the position of the first focusing lens.

A sound output controlling method according to the present disclosure is a sound output controlling method performed by a display apparatus that projects a first image on a projection surface via a first focusing lens and outputs sound based on a sound signal, the method including receiving, from another display apparatus that projects a second image on the projection surface via a second focusing lens and outputs sound based on the sound signal, position information on a position of the second focusing lens set based on a focused state of the second image on the projection surface, setting a position of the first focusing lens based on a focused state of the first image on the projection surface, and controlling the output of the sound from the display apparatus based on the position information and the position of the first focusing lens.

DESCRIPTION OF EXEMPLARY EMBODIMENTS

A. First Embodiment

A1: Overview of Display System 1000

Figure 1:
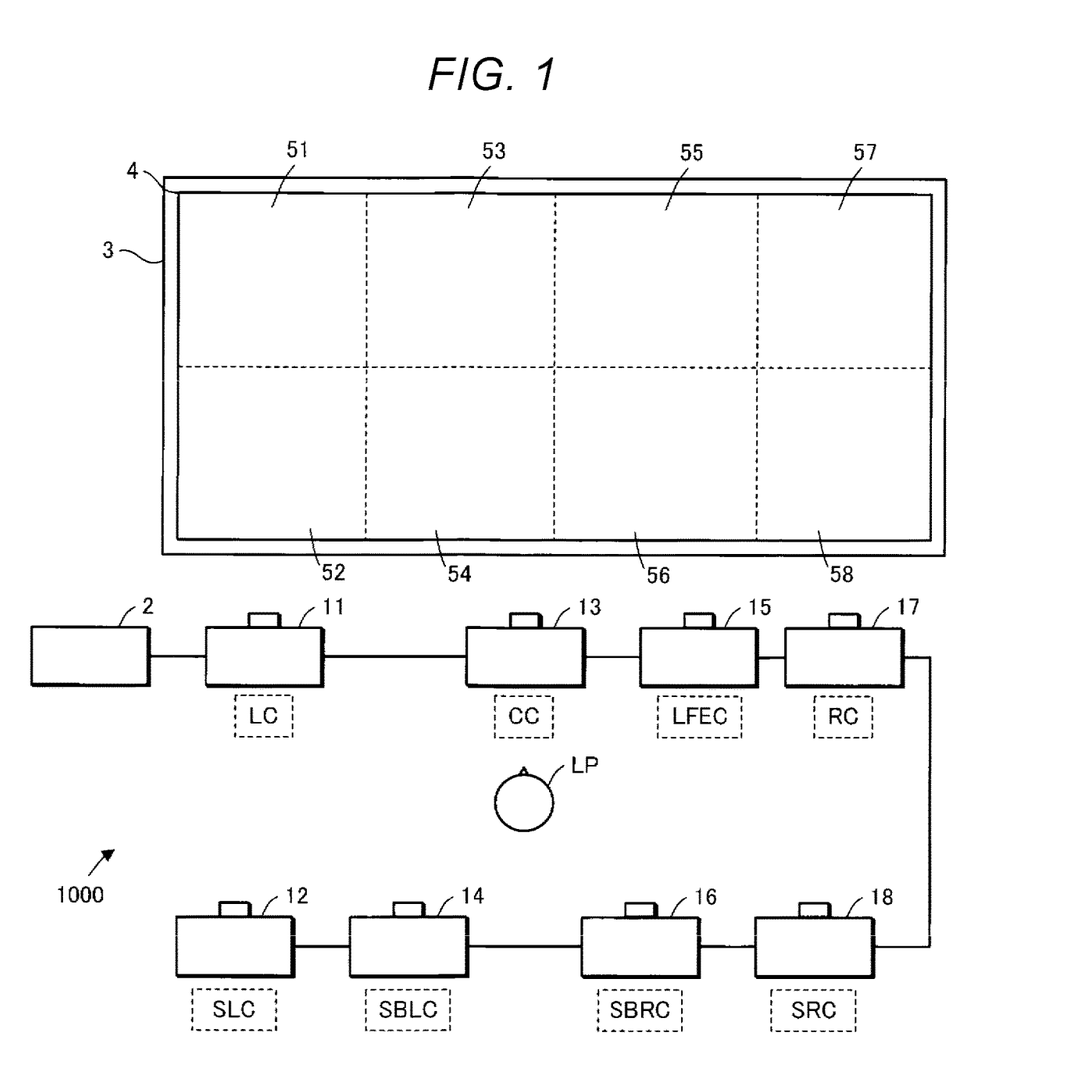
FIG. 1 shows an example of a display system according to a first embodiment.

FIG. 1 shows an example of a display system 1000 according to a first embodiment. The display system 1000 includes first projector 11 to an eighth projector 18. The first projector 11 to the eighth projector 18 are coupled to a source instrument 2 in a daisy chain scheme in the following order: the first projector 11; the third projector 13; the fifth projector 15; the seventh projector 17; the eighth projector 18; the sixth projector 16; the fourth projector 14; and the second projector 12. The form in which the first projector 11 to the eighth projector 18 are coupled to each other is not limited to the daisy chain scheme and can be changed as appropriate.

In the following description, when the first projector 11 to the eighth projector 18 do not need to be distinguished from one another, the first projector 11 to the eighth projector 18 are each referred to as a "projector 1." The number of projectors 1 provided in the display system 1000 is not limited to eight and may be two or more. The projectors 1 are each an example of a display apparatus.

The first projector 11 to the eighth projector 18 each project an image on a projection surface 3 and output sound.

The first projector 11, the third projector 13, the fifth projector 15, and the seventh projector 17 are so located that the distance from the projection surface 3 is smaller than a first reference distance. The position where the distance from the projection surface 3 is smaller than the first reference distance is hereinafter also referred to as a "front position."

The second projector 12, the fourth projector 14, the sixth projector 16, and the eighth projector 18 are so located that the distance from the projection surface 3 is greater than or equal to a second reference distance. The second reference distance is greater than the first reference distance. The position where the distance from the projection surface 3 is greater than or equal to the second reference distance is hereinafter also referred to as a "rear position."

A user is located, for example, in a listening position LP and listens to sound outputted from each of the first projector 11 to the eighth projector 18. The listening position LP is a position so set in advance as to allow the user to sound outputted from each of the first projector 11 to the eighth projector 18.

The distance from the listening position LP to the projection surface 3 is greater than the first reference distance but smaller than the second reference distance. Therefore, when the user is located in the listening position LP, the first projector 11, the third projector 13, the fifth projector 15, and the seventh projector 17 are each located in front of the user, and the second projector 12, the fourth projector 14, the sixth projector 17, and the eighth projector 18 are each located behind the user.

The source instrument 2 is, for example, a personal computer (PC). The source instrument 2 is not limited to a PC and may, for example, be a tablet terminal, a smartphone, a video reproduction apparatus, a DVD (digital versatile disc) player, a Blu-ray disc player, a hard disk recorder, a television tuner, or a video game console.

The source instrument 2 is coupled to the first projector 11. The source instrument 2 outputs the following signals to the first projector 11: a projection image signal representing a projection image 4, which is an example of an image to be projected by the display system 1000 on the projection surface 3; and a sound signal representing sound to be outputted by the display system 1000. The source instrument 2 is an example of a source that supplies the sound signal.

The image projection signal and the sound signal are forwarded to the projectors 1 in the following order: the first projector 11; the third projector 13; the fifth projector 15; the seventh projector 17; the eighth projector 18; the sixth projector 16; the fourth projector 14; and the second projector 12.

The first projector 11 to the eighth projector 18 each project different portions of the projection image 4 on the projection surface 3. The portions of the projection image 4 that are projected by the first projector 11 to the eighth projector 18 are set in advance in the first projector 11 to the eighth projector 18.

The image projected by the first projector 11 is hereinafter a "first projection image 51." The image projected by the second projector 12 is hereinafter a "second projection image 52." The image projected by the third projector 13 is hereinafter a "third projection image 53." The image projected by the fourth projector 14 is hereinafter a "fourth projection image 54." The image projected by the fifth projector 15 is hereinafter a "fifth projection image 55." The image projected by the sixth projector 16 is hereinafter a "sixth projection image 56." The image projected by the seventh projector 17 is hereinafter a "seventh projection image 57." The image projected by the eighth projector 18 is hereinafter an "eighth projection image 58."

The sound signal is a surround audio signal. A 7.1-channel signal is used as the sound signal. The 7.1-channel signal includes a left front channel (LC) signal, a right front channel (RC) signal, a center channel (CC) signal, a surround left channel (SLC) signal, a surround right channel (SRC) signal, a surround back left channel (SBLC) signal, a surround back right channel (SBRC) signal, and a low-frequency sound enhancement effect channel (LFEC) signal.

The LC signal, the RC signal, the CC signal, the SLC signal, the SRC signal, the SBLC signal, the SBRC signal, and the LFEC signal are each a channel signal.

The SLC signal, the SRC signal, the SBLC signal, and the SBRC signal are each an example of surround channel signals.

The LC signal, the RC signal, the CC signal, and the LFEC signal are each an example of a channel signal different from the surround channel signals.

The sound signal is not limited to the 7.1-channel signal and may instead be a 5.1-channel signal. The 5.1-channel signal contains the LC signal, the RC signal, the CC signal, the SLC signal, the SRC signal, and the LFEC signal but does not contain the SBLC signal or the SBRC signal.

The first projector 11 to the eighth projector 18 each include a focusing lens and have an automatic focus function of automatically adjusting the position of the focusing lens.

The first projector 11 controls the output of the sound from each of the first projector 11 to the eighth projector 18 based on the position of the focusing lens of the corresponding one of the first projector 11 to the eighth projector 18.

For example, the first projector 11 allocates any of the channel signals contained in the 7.1-channel signal to each of the first projector 11 to the eighth projector 18 based on the position of the focusing lens of the corresponding one of the first projector 11 to the eighth projector 18.

A2: Example of First Projector 11

Figure 2:
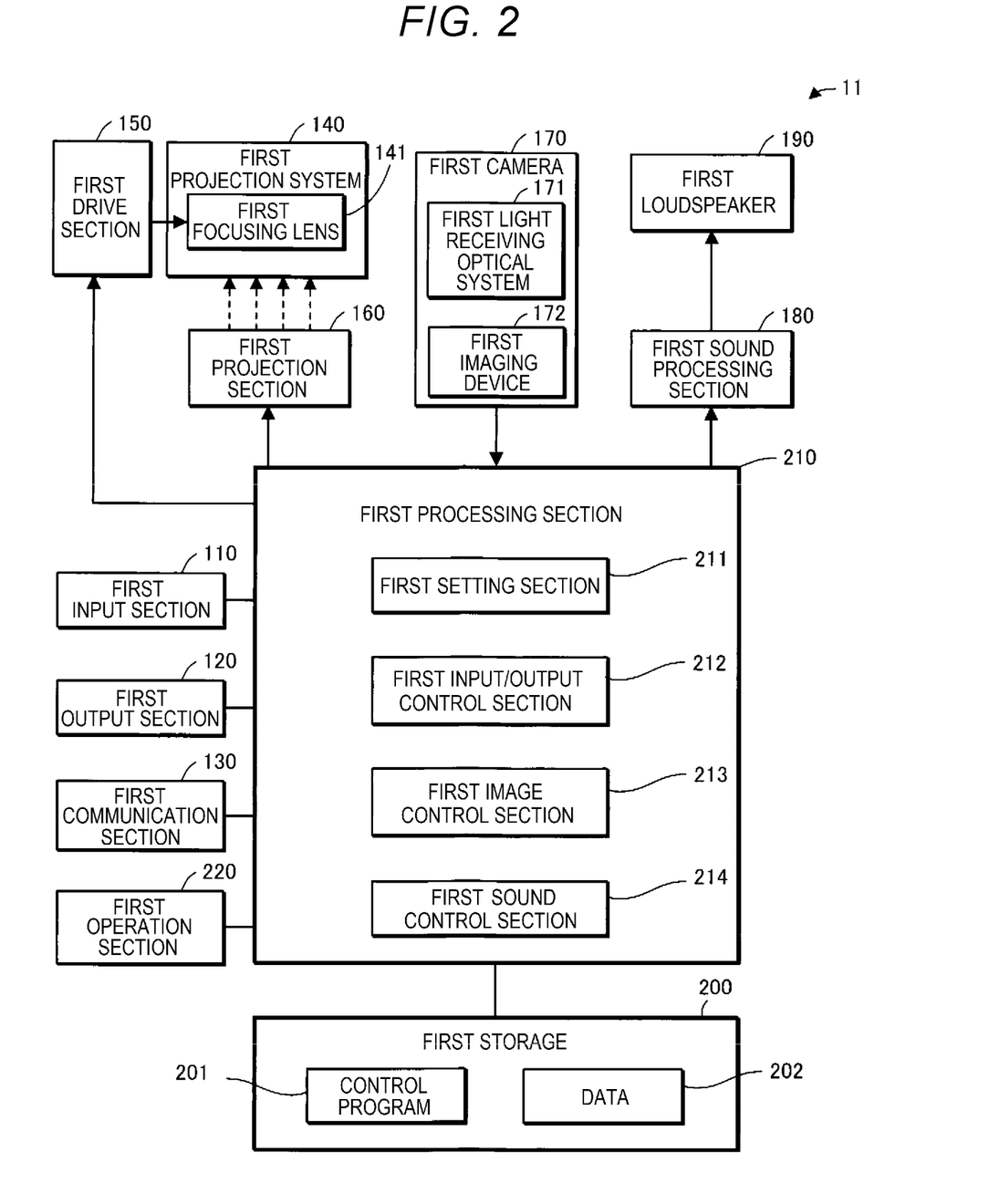
FIG. 2 shows an example of a first projector.

FIG. 2 shows an example of the first projector 11. The first projector 11 is an example of the display apparatus. The first projector 11 includes a first input section 110, a first output section 120, a first communication section 130, a first projection system 140, a first drive section 150, a first projection section 160, a first camera 170, a first sound processing section 180, a first loudspeaker 190, a first storage 200, a first processing section 210, and a first operation section 220.

The first input section 110 receives an audio visual (AV) signal containing the projection image signal and the sound signal from the source instrument 2. The first input section 110 is, for example, an interface compliant with the HDMI (high definition multimedia interface) standard. HDMI is a registered trademark. The first input section 110 is not limited to an interface compliant with the HDMI standard. For example, the first input section 110 may instead be a wireless or wired LAN (local area network) interface.

The first output section 120 outputs the AV signal received by the first input section 110 to the third projector 13. The first output section 120 is, for example, an interface compliant with the HDMI standard. The first output section 120 is not limited to an interface compliant with the HDMI standard. For example, the first output section 120 may instead be a wireless or wired LAN interface.

The first communication section 130 communicates with the source instrument 2 and the third projector 13. For example, the first communication section 130 performs communication based on the HDMI standard. The first communication section 130 may instead perform wireless or wired LAN communication. The first communication section 130 may still instead perform both the HDMI-standard-based communication and the wireless or wired LAN communication. The following description will be described with reference to a case where the first communication section 130 performs the wireless or wired LAN communication. The first communication section 130 receives position information representing the position of the focusing lens in each of the second projector 12 to the eighth projector 18. The first communication section 130 is an example of a receiver.

The first projection system 140 is used to project the first projection image 51. The first projection system 140 includes a first focusing lens 141.

The first drive section 150 adjusts the position of the first focusing lens 141 under the control of the first processing section 210. In the following description, the position of the first focusing lens 141 means the position of the first focusing lens 141 in the first projection system 140. The focused state of the first projection image 51 on the projection surface 3 varies in accordance with the position of the first focusing lens 141. The position of the first focusing lens 141 at which the first projection image 51 is brought into focus on the projection surface 3 varies in accordance with the distance between the first projector 11 and the projection surface 3.

The first projection section 160 projects the first projection image 51 on the projection surface 3 via the first projection system 140, in detail, the first focusing lens 141.

The first camera 170 captures an image of the projection surface 3 to produce first captured image data. The first camera 170 includes a first light receiving optical system 171, such as a lens, and a first imaging device 172, which converts light collected by the first light receiving optical system 171 into an electric signal. The first imaging device 172 is, for example, a CCD (charge coupled device) image sensor. The first imaging device 172 is not limited to a CCD image sensor and may instead, for example, be a CMOS (complementary metal oxide semiconductor) image sensor.

The first camera 170 may be provided as a component separate from the first projector 11. In this case, the first camera 170 and the first projector 11 are coupled to each other via a wired or wireless interface so that the first camera 170 and the first projector 11 can transmit and receive data to and from each other.

The first sound processing section 180 processes the sound signal. For example, the first sound processing section 180 processes the sound signal based on a sound volume instruction received via the first operation section 220 to change the sound volume indicated by the sound signal. The first loudspeaker 190 outputs sound based on the sound signal outputted from the first sound processing section 180.

The first storage 200 is a recording medium readable by the first processing section 210. The first storage 200 includes, for example, a nonvolatile memory and a volatile memory. Examples of the nonvolatile memory may include a ROM (read only memory), an EPROM (erasable programmable read only memory), and an EEPROM (electrically erasable programmable read only memory). Examples of the volatile memory may include a RAM (random access memory).

The first storage 200 stores a control program 201, which is executed by the first processing section 210, and a variety of data 202, which are used by the first processing section 210.

The first processing section 210 is formed, for example, of a single processor or a plurality of processors.

As an example, the first processing section 210 is formed of a single CPU (central processing unit) or a plurality of CPUs. Part or entirety of the functions of the first processing section 210 may be achieved by a DSP (digital signal processor), an ASIC (application specific integrated circuit), a PLD (programmable logic device), an FPGA (field programmable gate array), or any other circuit. The first processing section 210 carries out a variety of processes in parallel or successively.

The first processing section 210 reads the control program 201 from the first storage 200 and executes the control program 201 to function as a first setting section 211, a first input/output control section 212, a first image control section 213, and a first sound control section 214.

The first setting section 211 sets the position of the first focusing lens 141 based on the focused state of the first projection image 51 on the projection surface 3. For example, the first setting section 211 identifies the focused state of the first projection image 51 on the projection surface 3 based on the first captured image data produced by the first camera 170. The first setting section 211 uses the first drive section 150 to set the position of the first focusing lens 141 based on the focused state of the first projection image 51 on the projection surface 3.

The first input/output control section 212 divides the AV signal received by the first input section 110 into two AV signals. The first input/output control section 212 outputs one of the two AV signals to the first output section 120. The first input/output control section 212 divides the other AV signal into the projection image signal and the sound signal. The first input/output control section 212 provides the first image control section 213 with the projection image signal and the first sound control section 214 with the sound signal.

The first image control section 213 acquires a first image signal representing the first projection image 51 from the projection image signal based on first area information representing an area of the projection image 4 that is the area occupied by the first projection image 51. The first area information is set by the user in advance and stored in the first storage 200. The first image control section 213 provides the first projection section 160 with the first image signal to cause the first projection section 160 to project the first projection image 51.

The first sound control section 214 controls the output of the sound from the first loudspeaker 190 based on the position of the first focusing lens 141 and the position of the focusing lens in the second projector 12.

In the present embodiment, the first sound control section 214 controls the output of the sound from each of the first projector 11 to the eighth projector 18 based on the position of the focusing lens in the corresponding one of the first projector 11 to the eighth projector 18.

For example, the first sound control section 214 specifies the channel signal used by each of the first projector 11 to the eighth projector 18 out of the channel signals in the 7.1-channel signal based on the position of the focusing lens in the corresponding one of the first projector 11 to the eighth projector 18. The first sound control section 214 transmits channel instructions representing the results of the specification of the channel signals to the second projector 12 to the eighth projector 18 via the first communication section 130.

The first operation section 220 is formed, for example, of a variety of operation buttons or operation keys or a touch panel. The first operation section 220 is provided as part of an enclosure of the first projector 11. The first operation section 220 receives the user's input operation. The first operation section 220 may instead be a remote control.

A3: Example of Second Projector 12 to Eighth Projector 18

Figure 3:
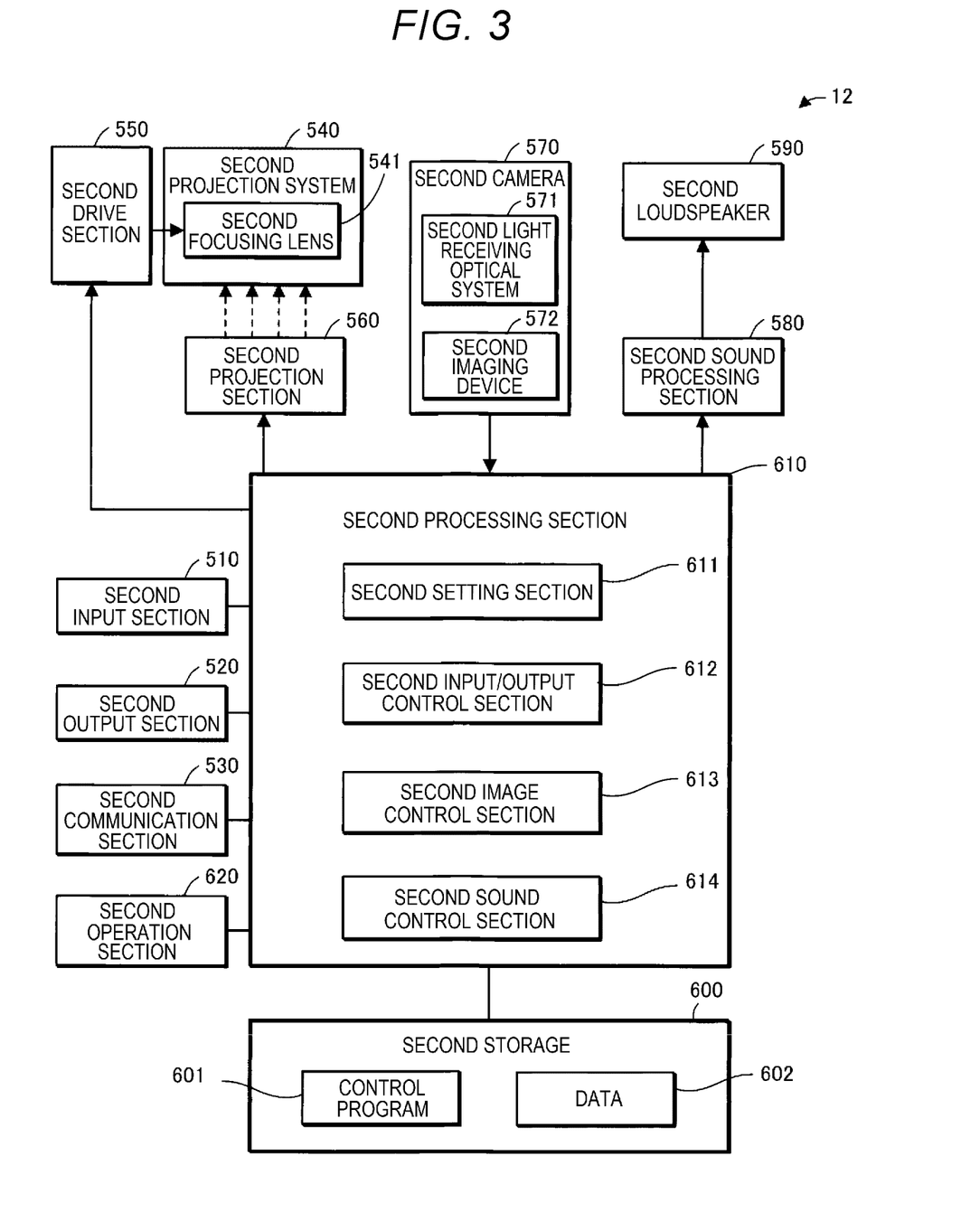
FIG. 3 shows an example of a second projector.

The second projector 12 to the eighth projector 18 have the same configuration except that they are coupled to different counterparts. Therefore, out of the second projector 12 to the eighth projector 18, the configuration of only the second projector 12 will be described for simplification of the description. The second projector 12 is an example of another display apparatus.

FIG. 3 shows an example of the second projector 12. The second projector 12 includes a second input section 510, a second output section 520, a second communication section 530, a second projection system 540, a second drive section 550, a second projection section 560, a second camera 570, a second sound processing section 580, a second loudspeaker 590, a second storage 600, a second processing section 610, and a second operation section 620.

The second projection system 540 has the same configuration as that of the first projection system. 140. The second projection section 560 has the same configuration as that of the first projection section 160. Therefore, when the distance from the second projector 12 to the projection surface 3 is equal to the distance from the first projector 11 to the projection surface 3, the position of a second focusing lens 541 is equal to the position of the first focusing lens 141. The position of the second focusing lens 541 means the position of the second focusing lens 541 in the second projection system 540.

The second input section 510 receives the AV signal from the fourth projector 14. The second input section 510 is, for example, an interface compliant with the HDMI standard. The second input section 510 is not limited to an interface compliant with the HDMI standard. For example, the second input section 510 may instead be a wireless or wired LAN interface.

When another projector is coupled to the second output section 520, the second output section 520 outputs the AV signal received by the second input section 510 to the other projector. The second output section 520 is, for example, an interface compliant with the HDMI standard. The second output section 520 is not limited to an interface compliant with the HDMI standard. For example, the second output section 520 may instead be a wireless or wired LAN interface.

The second communication section 530 communicates with the fourth projector 14. The second communication section 530 performs the communication by using the same communication method as the communication method employed by the first communication section 130. The second communication section 530 transmits position information representing the position of the second focusing lens 541 to the second communication section 530 of the fourth projector 14. The second communication section 530 is an example of a transmitter.

The second projection system 540 is used to project the second projection image 52. The second projection system 540 includes the second focusing lens 541.

The second drive section 550 adjusts the position of the second focusing lens 541 under the control of the second processing section 610.

The second projection section 560 projects the second projection image 52 on the projection surface 3 via the second projection system 540, in detail, the second focusing lens 541. The second projection section 560 has the same configuration as that of the first projection section 160.

The second camera 570 captures an image of the projection surface 3 to produce second captured image data. The second camera 570 includes a second light receiving optical system 571, such as a lens, and a second imaging device 572, which converts light collected by the second light receiving optical system 571 into an electric signal. The second imaging device 572 is, for example, a CCD image sensor. The second imaging device 572 is not limited to a CCD image sensor and may instead, for example, be a CMOS image sensor.

The second camera 570 may be provided as a component separate from the second projector 12. In this case, the second camera 570 and the second projector 12 are coupled to each other via a wired or wireless interface so that the second camera 570 and the second projector 12 can transmit and receive data to and from each other.

The second sound processing section 580 processes the sound signal. For example, the second sound processing section 580 processes the sound signal based on a sound volume instruction received via the second operation section 620 to change the sound volume indicated by the sound signal. The second loudspeaker 590 outputs sound based on the sound signal processed by the second sound processing section 580.

The second storage 600 is a recording medium readable by the second processing section 610. The second storage 600 includes, for example, a nonvolatile memory and a volatile memory. The second storage 600 stores a control program 601, which is executed by the second processing section 610, and a variety of data 602, which are used by the second processing section 610.

The second processing section 610 is formed, for example, of a single processor or a plurality of processors. As an example, the second processing section 610 is formed of a single CPU or a plurality of CPUs. Part or entirety of the functions of the second processing section 610 may be achieved by a DSP, an ASIC, a PLD, an FPGA, or any other circuit. The second processing section 610 carries out a variety of processes in parallel or successively.

The second processing section 610 reads the control program 601 from the second storage 600 and executes the control program 601 to function as a second setting section 611, a second input/output control section 612, a second image control section 613, and a second sound control section 614.

The second setting section 611 sets the position of the second focusing lens 541 based on the focused state of the second projection image 52 on the projection surface 3. The method in accordance with which the second setting section 611 sets the position of the second focusing lens 541 is the same as the method in accordance with which the first setting section 211 sets the position of the first focusing lens 141.

The second input/output control section 612 divides the AV signal received by the second input section 510 into two AV signals. The second input/output control section 612 outputs one of the two AV signals to the second output section 520. The second input/output control section 612 divides the other AV signal into the projection image signal and the sound signal. The second input/output control section 612 provides the second image control section 613 with the projection image signal and the second sound control section 614 with the sound signal.

The second image control section 613 acquires a second image signal representing the second projection image 52 from the projection image signal based on second area information representing an area of the projection image 4 that is the area occupied by the second projection image 52. The second area information is set by the user in advance and stored in the second storage 600. The second image control section 613 provides the second projection section 560 with the second image signal to cause the second projection section 560 to project the second projection image 52.

The second sound control section 614 controls the output of the sound from the second loudspeaker 590 based on a channel instruction provided from the first projector 11.

The second operation section 620 is formed, for example, of a variety of operation buttons or operation keys or a touch panel. The second operation section 620 is provided as part of an enclosure of the second projector 12. The second operation section 620 receives the user's input operation. The second operation section 620 may instead be a remote control.

A4: Examples of First Projection Section 160 and Second Projection Section 560

Figure 4:
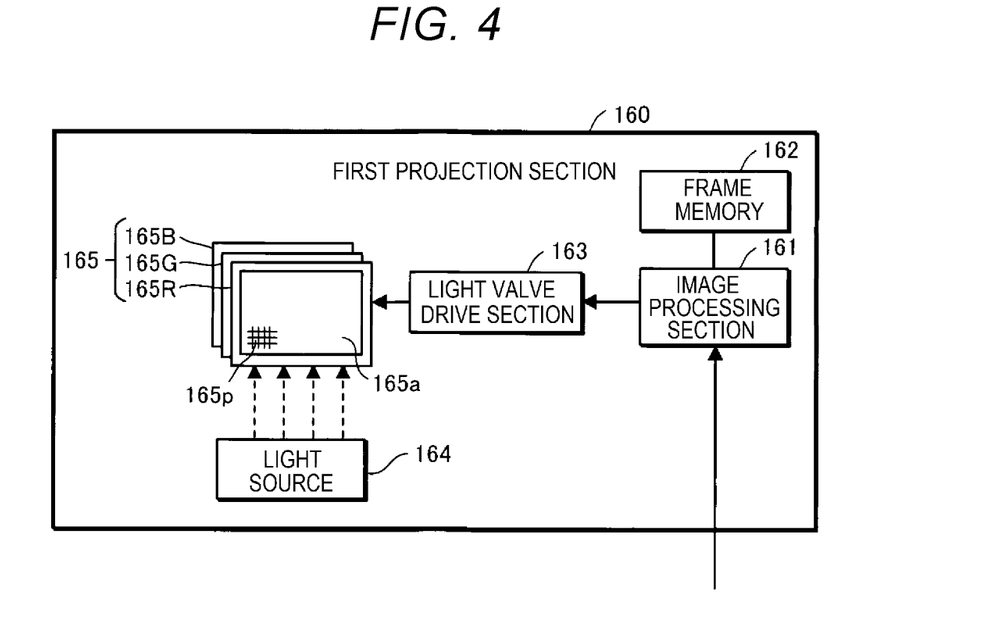
FIG. 4 shows an example of a first projection section.

The first projection section 160 and the second projection section 560 have the same configuration, as described above. Therefore, out of the configurations of the first projection section 160 and the second projection section 560, the configuration of only the first projection section 160 will be described for simplification of the description.

FIG. 4 shows an example of the first projection section 160. The first projection section 160 includes an image processing section 161, a frame memory 162, a light valve drive section 163, a light source 164, a red liquid crystal light valve 165R, a green liquid crystal light valve 165G, and a blue liquid crystal light valve 165B. In the following description, when the red liquid crystal light valve 165R, the green liquid crystal light valve 165G, and the blue liquid crystal light valve 165B do not need to be distinguished from one another, they are referred to as "liquid crystal light valves 165."

The image processing section 161 is formed of a single image processor, a plurality of image processors, or any other circuit. The image processing section 161 receives an image signal, for example, from the first processing section 210.

The image processing section 161 develops the image signal in the frame memory 162. The frame memory 162 is formed, for example, of a storage device, such as a RAM. The image processing section 161 performs image processing on the image signal developed in the frame memory 162 to produce image data.

The image processing performed by the image processing section 161 includes, for example, resolution conversion. In the resolution conversion, the image processing section 161 converts the resolution of the image signal, for example, into the resolution of the liquid crystal light valves 165. The image processing section 161 may perform, in addition to the resolution conversion, another type of image processing, for example, geometric correction of correcting trapezoidal distortion of an image projected by the first projection section 160.

The light valve drive section 163 is formed, for example, of a driver or any other circuit. The light valve drive section 163 drives the liquid crystal light valves 165 based on the image data provided from the image processing section 161.

The light source 164 is, for example, an LED. The light source 164 is not limited to an LED and may, for example, be a xenon lamp, an ultrahigh-pressure mercury lamp, or a laser light source. The light outputted from the light source 164 passes through an optical integration system that is not shown, which reduces variation in the luminance distribution of the light, and the resultant light is separated by a color separation system that is not shown into color light components of red, green, and blue, which are the three primary colors of light. The red light component is incident on the red liquid crystal light valve 165R. The green light component is incident on the green liquid crystal light valve 165G. The blue light component is incident on the blue liquid crystal light valve 165B.

The liquid crystal light valves 165 are each formed, for example, of a liquid crystal panel formed of a liquid crystal material present between a pair of transparent substrates. The liquid crystal light valves 165 each have a rectangular pixel area 165a including a plurality of pixels 165p arranged in a matrix. In each of the liquid crystal light valves 165, drive voltage is applied to the liquid crystal material for each of the pixels 165p. When the light valve drive section 163 applies drive voltage based on the image data to each of the pixels 165p, the pixel 165p has light transmittance set based on the drive voltage. The light outputted from the light source 164 passes through the pixel area 165a, which modulates the light, so that images based on the image signal are formed on a color light basis. The liquid crystal light valves 165 are each an example of a light modulator.

The color images are combined with one another by a light combining system that is not shown for each of the pixels 165p into a color image.

A5: Example of Actions of Second Projector 12 to Eighth Projector 18

Figure 5:
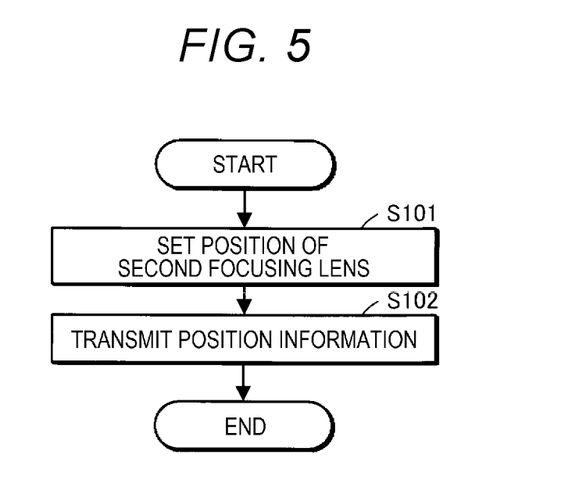
FIG. 5 describes the action of the second projector.

The second projector 12 to the eighth projector 18 have the same configuration except that they are coupled to different counterparts, as described above. Therefore, out of the actions of the second projector 12 to the eighth projector 18, the action of the second projector 12 will be primarily described for simplification of the description.

FIG. 5 describes the action of the second projector 12. It is assumed in the following description that the second projector 12 receives the AV signal via the second input section 510 and projects the second projection image 52 on the projection surface 3 via the second focusing lens 541.

In step S101, the setting section 611 sets the position of the second focusing lens 541.

In step S101, the second setting section 611 first causes the second camera 570 to produce the second captured image data while using the second drive section 550 to move the position of the second focusing lens 541 and checks the focused state of the second projection image 52 indicated by the second captured image data. The second setting section 611 subsequently uses the second drive section 550 to set the position of the second focusing lens 541 at the position where the second projection image 52 is brought into focus on the projection surface 3.

In step S102, the second communication section 530 subsequently transmits position information representing the position of the second focusing lens 541 to the second communication section 530 of the fourth projector 14.

For example, the second setting section 611 produces the position information representing the position of the second focusing lens 541, and the second communication section 530 transmits the position information produced by the second setting section 611 to the second communication section 530 of the fourth projector 14.

Actions specific to the third projector 13 to the eighth projector 18 will next be described.

Upon reception of the position information representing the position of the second focusing lens 541 in the second projector 12, the fourth projector 14 transmits the position information representing the position of the second focusing lens 541 in each of the second projector 12 and the fourth projector 14 to the sixth projector 16.

Upon reception of the position information representing the position of the second focusing lens 541 in each of the second projector 12 and the fourth projector 14, the sixth projector 16 transmits the position information representing the position of the second focusing lens 541 in each of the second projector 12, the fourth projector 14, and the sixth projector 16 to the eighth projector 18.

Upon reception of the position information representing the position of the second focusing lens 541 in each of the second projector 12, the fourth projector 14, and the sixth projector 16, the eighth projector 18 transmits the position information representing the position of the second focusing lens 541 in each of the second projector 12, the fourth projector 14, the sixth projector 16, and the eighth projector 18 to the seventh projector 17.

Upon reception of the position information representing the position of the second focusing lens 541 in each of the second projector 12, the fourth projector 14, the sixth projector 16, and the eighth projector 18, the seventh projector 17 transmits the position information representing the position of the second focusing lens 541 in each of the second projector 12, the fourth projector 14, and the sixth projector 16 to the eighth projector 18 to the fifth projector 15.

Upon reception of the position information representing the position of the second focusing lens 541 in each of the second projector 12, the fourth projector 14, and the sixth projector 16 to the eighth projector 18, the fifth projector 15 transmits the position information representing the position of the second focusing lens 541 in each of the second projector 12, and the fourth projector 14 to the eighth projector 18 to the third projector 13.

Upon reception of the position information representing the position of the second focusing lens 541 in each of the second projector 12 and the fourth projector 14 to the eighth projector 18, the third projector 13 transmits the position information representing the position of the second focusing lens 541 in each of the second projector 12 to the eighth projector 18 to the first projector 11.

A6: Example of Action of First Projector 11

Figure 6:
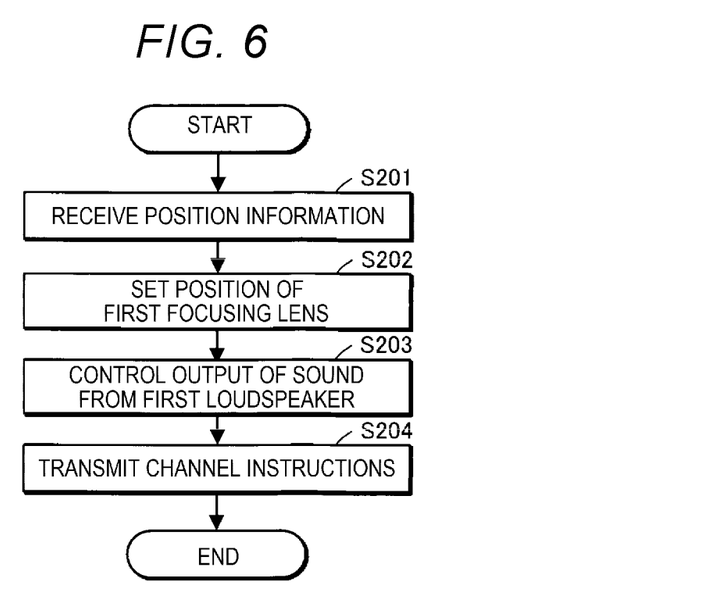
FIG. 6 describes the action of the first projector.

FIG. 6 describes the action of the first projector 11. It is assumed in the following description that the first projector 11 receives the AV signal via the first input section 110 and projects the first projection image 51 on the projection surface 3 via the first focusing lens 141.

In step S201, upon reception of the position information representing the position of the second focusing lens 541 in each of the second projector 12 to the eighth projector 18 from the third projector 13, the first communication section 130 provides the first sound control section 214 with the position information.

In step S202, the first setting section 211 subsequently sets the position of the first focusing lens 141.

In step S202, the first setting section 211 first causes the first camera 170 to produce the first captured image data while using the first drive section 150 to move the position of the first focusing lens 141 and checks the focused state of the first projection image 51 indicated by the first captured image data.

The first setting section 211 subsequently uses the first drive section 150 to set the position of the first focusing lens 141 at the position where the first projection image 51 is brought into focus on the projection surface 3. The first setting section 211 provides the first sound control section 214 with position information representing the position of the first focusing lens 141.

The order of step S201 and step S202 may be reversed.

In step S203, the first sound control section 214 subsequently controls the output of the sound from the first loudspeaker 190.

An example of step S203 will be described below.

The first sound control section 214 estimates a first distance between the projection surface 3 and the first projector 11 based on the position of the first focusing lens 141.

For example, the first sound control section 214 estimates the first distance by referring to a table in which the position of the first focusing lens 141 is associated with the distance between the projection surface 3 and the first projector 11.

The first sound control section 214 may estimate the first distance by using a function representing the association between the position of the first focusing lens 141 and the distance between the projection surface 3 and the first projector 11.

Further, the first sound control section 214 estimates a second distance between the projection surface 3 and the second projector 12 based on the position of the second focusing lens 541 of the second projector 12.

The first sound control section 214 estimates a third distance between the projection surface 3 and the third projector 13 based on the position of the second focusing lens 541 of the third projector 13.

The first sound control section 214 estimates a fourth distance between the projection surface 3 and the fourth projector 14 based on the position of the second focusing lens 541 of the fourth projector 14.

The first sound control section 214 estimates a fifth distance between the projection surface 3 and the fifth projector 15 based on the position of the second focusing lens 541 of the fifth projector 15.

The first sound control section 214 estimates a sixth distance between the projection surface 3 and the sixth projector 16 based on the position of the second focusing lens 541 of the sixth projector 16.

The first sound control section 214 estimates a seventh distance between the projection surface 3 and the seventh projector 17 based on the position of the second focusing lens 541 of the seventh projector 17.

The first sound control section 214 estimates an eighth distance between the projection surface 3 and the eighth projector 18 based on the position of the second focusing lens 541 of the eighth projector 18.

The method for estimating each of the second to eight distances is the same as the method for estimating the first distance.

The first sound control section 214 controls the output of the sound from the first loudspeaker 190 in accordance, for example, with the difference between the first distance and the second distance and the mutual magnitude relationship between the first distance and second distance based on the relationship between the first and second distances.

As an example, when the second distance is greater than the sum of the first distance and a first predetermined distance, for example, when the first projector 11 is installed in the front position and the second projector 12 is installed in the rear position, the first sound control section 214 allocates any of the LC signal, the RC signal, the CC signal, and the LFEC signal as the signal to be supplied to the first loudspeaker 190. The first predetermined distance is a distance greater than 0 m.

When the first distance is greater than the sum of the second distance and a second predetermined distance, for example, when the first projector 11 is installed in the rear position and the second projector 12 is installed in the front position, the first sound control section 214 allocates any of the SLC signal, the SRC signal, the SBLC signal, and the SBRC signal as the signal to be supplied to the first loudspeaker 190. The second predetermined distance is a distance greater than 0 m. The second predetermined distance may be equal to the first predetermined distance or may differ therefrom. It is assumed in the following description that the second predetermined distance is equal to the first predetermined distance.

When the second distance is smaller than or equal to the sum of the first distance and the first predetermined distance and the first distance is smaller than or equal to the sum of the second distance and the second predetermined distance, the first sound control section 214 determines the signal to be supplied to the first loudspeaker 190 based on the relationship between any of the third to eighth distances and the first distance.

For example, when the first distance is greater than the sum of any of the third to eighth distances and the second predetermined distance, the first sound control section 214 allocates any of the SLC signal, the SRC signal, the SBLC signal, and the SBRC signal, for example, the SLC signal as the signal to be supplied to the first loudspeaker 190.

When any of the third to eighth distances is greater than the sum of the first distance and the first predetermined distance, the first sound control section 214 allocates any of the LC signal, the RC signal, the CC signal, and the LFEC signal, for example, the LC signal as the signal to be supplied to the first loudspeaker 190.

FIG. 1 shows a case where the LC signal is allocated to the first loudspeaker 190.

The first sound control section 214 subsequently controls the output of the sound from the first loudspeaker 190 by providing the second sound processing section 580 with a channel signal allocated as the signal to be supplied to the first loudspeaker 190 out of the plurality of channel signals contained in the 7.1-channel signal.

An example of step S203 has been described.

In step S204, the first projector 11 subsequently transmits channel instructions to the second projector 12 to the eighth projector 18 via the first communication section 130.

An example of step S204 will be described below.

The first sound control section 214 uses the first distance to determine the channel instructions to be transmitted to the second projector 12 to the eighth projector 18.

For example, the first sound control section 214 first divides the second projector 12 to the eighth projector 18 into a first group in which the difference between the distance to the projection surface 3 and the first distance is smaller than or equal to the first predetermined distance and a second group in which the difference between the distance to the projection surface 3 and the first distance is greater than the first predetermined distance. In the example shown in FIG. 1, the third projector 13, the fifth projector 15, and the seventh projector 17 belong to the first group, and the second projector 12, the fourth projector 14, the sixth projector 16, and the eighth projector 18 belong to the second group.

When any of the LC signal, the RC signal, the CC signal, and the LFEC signal is allocated to the first loudspeaker 190, the first sound control section 214 allocates a channel signal that has not been allocated to the first loudspeaker 190 out of the LC signal, the RC signal, the CC signal, and the LFEC signal to each of the projectors 1 that belongs to the first group with no duplication.

In this case, the first sound control section 214 allocates any of the SLC signal, the SRC signal, the SBLC signal, and the SBRC signal to each of the projector 1 that belongs to the second group with no duplication.

FIG. 1 shows a case where the SLC signal is allocated to the second projector 12, the CC signal is allocated to the third projector 13, the SBLC signal is allocated to the fourth projector 14, the LFEC signal is allocated to the fifth projector 15, the SBRC signal is allocated to the sixth projector 16, the RC signal is allocated to the seventh projector 17, and the SRC signal is allocated to the eighth projector 18.

When any of the SLC signal, the SRC signal, the SBLC signal, and the SBRC signal is allocated to the first loudspeaker 190, the first sound control section 214 allocates a channel signal that has not been allocated to the first loudspeaker 190 out of the SLC signal, the SRC signal, the SBLC signal, and the SBRC signal to each of the projectors 1 that belongs to the first group with no duplication. In this case, the first sound control section 214 allocates any of the LC signal, the RC signal, the CC signal, and the LFEC signal to each of the projector 1 that belongs to the second group with no duplication.

The first sound control section 214 subsequently transmits channel instructions representing the results of the channel signal allocation to the second projector 12 to the eighth projector 18 via the first communication section 130.

An example of step S204 has been described.

The second projector 12 to the eighth projector 18 each receive the channel instructions and select channel signals to be used to output sound from the plurality of channel signals contained in the 7.1-channel signal based on the channel instructions. The second projector 12 to the eighth projector 18 each output sound based on the selected channel signal.

For example, when the channel instruction received by the second projector 12 indicates allocation of the SLC signal to the second projector 12, the second sound control section 614 of the second projector 12 provides the second sound processing section 580 with the SLC signal contained in the 7.1-channel signal to cause the second loudspeaker 590 to output sound based on the SLC signal.

In the present embodiment, the first sound control section 214 may control the volume of the sound from the first loudspeaker 190 based on the relationship between the first distance and the second distance.

For example, when the second distance is greater than the sum of the first distance and the first predetermined distance, the first sound control section 214 lowers the volume of the sound from the first loudspeaker 190 to a level lower than a first level, whereas when the first distance is greater than the sum of the second distance and the second predetermined distance, the first sound control section 214 raises the volume of the sound from the first loudspeaker 190 to a level higher than the first level.

Further, when the first sound control section 214 lowers the volume of the sound from the first loudspeaker 190 to a level lower than the first level, the first sound control section 214 lowers the volume of the sound from the projectors 1 that belong to the first group to a level lower than the first level and raises the volume of the sound from the projectors 1 that belong to the second group to a level higher than the first level.

When the first sound control section 214 raises the volume of the sound from the first loudspeaker 190 to a level higher than the first level, the first sound control section 214 raises the volume of the sound from the projectors 1 that belong to the first group to a level higher than the first level and lowers the volume of the sound from the projectors 1 that belong to the second group to a level lower than the first level.

When the volume of sound outputted from each of the first projector 11 to the eighth projector 18 is controlled based on the first to eighth distances, the first projector 11 may not allocate channel signals to the first projector 11 to the eighth projector 18.

In the present embodiment, the first sound control section 214 may correct the results of the channel signal allocation based on a correction instruction received from the user via the first operation section 220.

According to the configuration described above, the user can correct the results of the allocation when the channel signal allocation performed by the first sound control section 214 is not appropriate. In this case, the results of the channel signal allocation performed by the first sound control section 214 function as initial values of the channel signal allocation.

According to the configuration described above, the channel signal allocation performed by the first sound control section 214 is likely to be correct, whereby the amount of work that the user needs to perform can be reduced as compared with a case where the user performs the entire allocation.

A7: Outline of First Embodiment

The sound output control method and the display system 1000 according to the present disclosure described above include the following aspects.

The first projector 11 includes the first focusing lens 141, the first projection section 160, which projects the first projection image 51 on the projection surface 3 via the first focusing lens 141, the first loudspeaker 190, and the first setting section 211, which sets the position of the first focusing lens 141 based on the focused state of the first projection image 51 on the projection surface 3.

The second projector 12 includes the second focusing lens 541, the second projection section 560, which projects the second projection image 52 on the projection surface 3 via the second focusing lens 541, the second loudspeaker 590, the second setting section 611, which sets the position of the second focusing lens 541 based on the focused state of the second projection image 52 on the projection surface 3, and the second communication section 530, which transmits the position information on the position of the second focusing lens 541.

The first projector 11 further includes the first communication section 130, which receives the position information, and the first sound control section 214, which controls the output of the sound from the first loudspeaker 190 based on the position information and the position of the first focusing lens 141.

The position of the first focusing lens 141 depends on the distance between the first projector 11 and the projection surface 3, and the position of the second focusing lens 541 depends on the distance between the second projector 12 and the projection surface 3. Therefore, according to the aspect described above, information on the distance between the first projector 11 to the projection surface 3 and information on the distance between the second projector 12 to the projection surface 3 can be reflected in the control of the state of the output of the sound from the first loudspeaker 190.

The position of the first focusing lens 141 is used as the information on the distance from the first projector 11 to the projection surface 3. Therefore, for example, the first projector 11 does not need to actually measure the distance from the first projector 11 to the projection surface 3 to obtain the information on the distance from the first projector 11 to the projection surface 3. The first projector 11 may instead actually measure the distance from the first projector 11 to the projection surface 3.

The position of the second focusing lens 541 is used as the information on the distance from the second projector 12 to the projection surface 3. Therefore, for example, the second projector 12 does not need to actually measure the distance from the second projector 12 to the projection surface 3 to obtain the information on the distance from the second projector 12 to the projection surface 3. The second projector 12 may instead actually measure the distance from the second projector 12 to the projection surface 3.

The first sound control section 214 controls the output of the sound from the first projector 11 based on the relationship between the first distance, which is the distance between the projection surface 3 and the first projector 11 and is estimated based on the position of the first focusing lens 141, and the second distance, which is the distance between the projection surface 3 and the second projector 12 and is estimated based on the position information. According to the aspect described above, the output of the sound from the first projector 11 can be controlled in accordance, for example, with the difference between the first distance and the second distance and the mutual magnitude relationship between the first distance and the second distance.

When the second distance is greater than the sum of the first distance and the first predetermined distance, the first sound control section 214 outputs sound based on a channel signal different from the surround channel signals, and when the first distance is greater than the sum of the second distance and the second predetermined distance, the first sound control section 214 outputs sound based on a surround channel signal. According to the aspect described above, the output of the sound based on a surround audio signal from the first loudspeaker 190 can be switched to another type of sound output in accordance with the relationship between the first distance and the second distance.

Variations

Aspects of variations of the embodiment presented above by way of example will be presented below by way of example. Two or more aspects arbitrarily selected from those presented below by way of example may be combined with each other as appropriate to the extent that the aspects to be combined with each other do not contradict each other.

B1: First Variation

In the first embodiment, the first sound control section 214 may control the output of the sound from the first projector 11 based on the position information, the position of the first focusing lens 141, and the coupling order of the first projector 11 in the daisy chain scheme. In this case, order information representing the coupling order of the first projector 11 in the daisy chain scheme is stored in the first storage 200 in advance, and the first sound control section 214 recognizes the coupling order of the first projector 11 in the daisy chain scheme by referring to the order information stored in the first storage 200.

For example, when the second distance is greater than the sum of the first distance and the first predetermined distance, and the first projector 11 is coupled first in the daisy chain scheme, the LC signal is allocated as the signal to be allocated to the first loudspeaker 190.

When the second distance is greater than the sum of the first distance and the first predetermined distance, and the first projector 11 is coupled second in the daisy chain scheme, the CC signal is allocated as the signal to be allocated to the first loudspeaker 190.

The first sound control section 214 determines the signal to be allocated to the first loudspeaker 190 by referring to a table that associates the first distance, the second distance, the coupling order of the first projector 11 in the daisy chain scheme, and the signal to be allocated to the first loudspeaker 190 with one another. The table is stored, for example, in the first storage 200.

The first sound control section 214 may instead determine the signals to be allocated to the first projector 11 to the eighth projector 18 by referring to a table that associates the first to eighth distances, the coupling order of the first projector 11 to the eighth projector 18 in the daisy chain scheme, and the signals to be allocated to the first projector 11 to the eighth projector 18 with one another. The table is stored, for example, in the first storage 200. Coupling order information representing the coupling order of the first projector 11 to the eighth projector 18 in the daisy chain scheme is stored in the first storage 200 in advance, and the first sound control section 214 recognizes the coupling order of the first projector 11 to the eighth projector 18 in the daisy chain scheme by referring to the coupling order information stored in the first storage 200.

B2: Second Variation

In the first embodiment and the first variation, the first sound control section 214 may control the output of the sound from the first projector 11 based on the position information, the position of the first focusing lens 141, and the first area information representing an area of the projection image 4 that is the area occupied by the first projection image 51.

For example, when the second distance is greater than the sum of the first distance and the first predetermined distance, and the first area information indicates the upper left area of the projection image 4, the first sound control section 214 allocates the LC signal as the signal to be allocated to the first loudspeaker 190.

When the second distance is greater than the sum of the first distance and the first predetermined distance, and the first area information indicates the upper right area of the projection image 4, the first sound control section 214 allocates the RC signal as the signal to be allocated to the first loudspeaker 190.

The first sound control section 214 may determine the signals to be allocated to the first loudspeaker 190 by referring to a table that associates the first distance, the second distance, the first area information, and the signal to be allocated to the first loudspeaker 190 with one another. The table is stored, for example, in the first storage 200.

The first sound control section 214 may instead determine the signals to be allocated to the first projector 11 to the eighth projector 18 by referring to a table that associates the first to eighth distances, the first area information, the second area information on the areas of the images projected by the second projector 12 to the eighth projector 18, and the signals to be allocated to the first projector 11 to the eighth projector 18 with one another. The table is stored, for example, in the first storage 200. The second area information on the areas of the images projected by the second projector 12 to the eighth projector 18 is stored in the first storage 200 in advance, and the first sound control section 214 refers to the second area information representing the areas of the images projected by the second projector 12 to the eighth projector 18 and stored in the first storage 200.

B3: Third Variation

In the first embodiment and the first to second variations, the first sound control section 214 may stop the channel signal allocation based on the first and the second distances when the number of projectors 1 provided in the display system 1000 is four or fewer.

When the display system 1000 is formed of four projectors 1, the first sound control section 214 allocates the LC signal, the CC signal, the LFEC signal, and the RC signal to the four projectors 1 with no duplication.

For example, the first sound control section 214 allocates the LC signal, the CC signal, the LFEC signal, and the RC signal to the four projectors 1 in accordance with the coupling order in the daisy chain scheme.

When the display system 1000 is formed of three projectors 1, the first sound control section 214 allocates the LC signal, the CC signal, and the RC signal to the three projectors 1 with no duplication.

For example, the first sound control section 214 allocates the LC signal, the CC signal, and the RC signal to the three projectors 1 in accordance with the coupling order in the daisy chain scheme.

When the display system 1000 is formed of two projectors 1, the first sound control section 214 allocates the LC signal and the RC signal to the two projectors 1 with no duplication.

For example, the first sound control section 214 allocates the LC signal and the RC signal to the two projectors 1 in accordance with the coupling order in the daisy chain scheme.

The maximum number of channels indicated by Short Audio Descriptor in Extended Display Identification Data (EDID) set in the first projector 11 may be changed in accordance with the number of projectors 1 that form the display system 1000.

Figure 7:
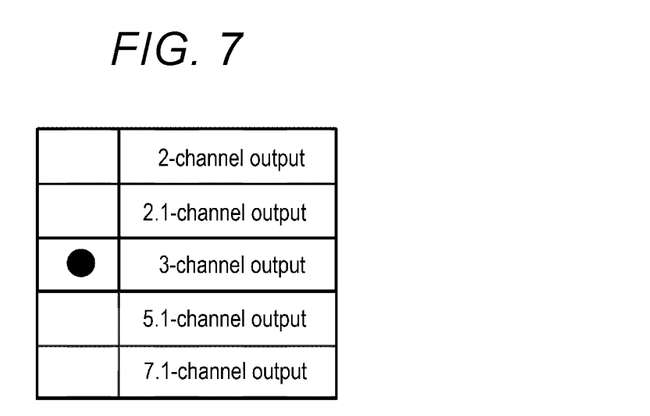
FIG. 7 shows an example of a menu screen.

FIG. 7 shows an example of a menu screen for setting the maximum number of channels by using the first operation section 220. In the menu screen shown in FIG. 7, candidates of the maximum number of channels that the user can set by using the first operation section 220 are changed in accordance with the number of projectors 1 that form the display system 1000.

For example, when the number of projectors 1 that form the display system 1000 is two, only two channels are so displayed as to be settable as the maximum number of channels.

When the number of projectors 1 that form the display system 1000 is any of three to five, 2 channels, 2.1 channels, and 3 channels, are so displayed as to be settable as the maximum number of channels.

When the number of projectors 1 that form the display system 1000 is six or seven, 2 channels, 2.1 channels, 3 channels, and 5.1 Channels are so displayed as to be settable as the maximum number of channels.

When the number of projectors 1 that form the display system 1000 is eight or greater, 2 channels, 2.1 channels, 3 channels, 5.1 Channels, and 7.1 channels are so displayed as to be settable as the maximum number of channels.

In FIG. 7, a non-selectable channel is displayed in gray. A non-selectable channel may instead be not displayed instead of being displayed in gray. The displayed contents on the menu screen are controlled, for example, by the first image control section 213.

When the maximum number of channels is set at the number specified by EDID set in the first projector 11, the source instrument 2 provides the first projector 11 with sound signals the number of which is the maximum number of channels that the source instrument 2 can output out of the maximum number of channels specified by EDID.

B4: Fourth Variation

In the first embodiment and the first to third variations, the second projector 12 to the eighth projector 18 may each have the same function as the function that allows the first projector 11 to control the output of the sound from the first loudspeaker 190 and may each independently control the output of the sound from the second loudspeaker 590. In this case, the first projector 11 transmits no channel instruction.

B5: Fifth Variation

In the first embodiment and the first to fourth variations, the liquid crystal valves 165 are used as an example of the light modulator, and the light modulator is not limited to liquid crystal light valves and can be changed as appropriate. For example, the light modulator may have a configuration using three reflective liquid crystal panels. The light modulator may still have a configuration using one liquid crystal panel, three digital mirror devices (DMDs), one digital mirror device, or any other component. When only one liquid crystal panel or DMD is used as the light modulator, no members corresponding to the color separation system and the light combining system are required. In place of liquid crystal panels or DMDs, a configuration capable of modulating the light outputted from the light source 21 is employable as the light modulator.

What is claimed is:

1. A sound output controlling method performed by a display system including
   a first projector that projects a first image on a projection surface via a first focusing lens and outputs sound based on a sound signal, and
   a second projector that projects a second image on the projection surface via a second focusing lens and outputs sound based on the sound signal,
   the method comprising:
   causing the second projector to set a position of the second focusing lens based on a focused state of the second image on the projection surface;
   causing the second projector to transmit position information on the position of the second focusing lens;
   causing the first projector to receive the position information;
   causing the first projector to set a position of the first focusing lens based on a focused state of the first image on the projection surface; and
   causing the first projector to control the output of the sound from the first projector based on the position information and the position of the first focusing lens,
   wherein the first projector controls the output of the sound from the first projector based on a relationship between
   a first distance that is a distance between the projection surface and the first projector and is estimated based on the position of the first focusing lens, and
   a second distance that is a distance between the projection surface and the second projector and is estimated based on the position information.

2. The sound output controlling method according to claim 1,
   wherein the sound signal is a surround audio signal containing a surround channel signal and a channel signal different from the surround channel signal, and
   the first projector
   outputs sound based on the channel signal different from the surround channel signals when the second distance is greater than a sum of the first distance and a first predetermined distance, and
   outputs sound based on the surround channel signal when the first distance is greater than a sum of the second distance and a second predetermined distance.

3. The sound output controlling method according to claim 1,
   wherein the first projector and the second projector are coupled to a source that supplies the sound signal in a daisy chain scheme, and
   the first projector control the output of the sound from the first projector based on the position information, the position of the first focusing lens, and a coupling order of the first projector in the daisy chain scheme.

4. The sound output controlling method according to claim 1,
   wherein the second projector
   acquires a second image signal representing the second image from a projection image signal based on second area information representing an area of a projection image to be projected on the projection surface by the display system that is an area occupied by the second image, the projection image signal representing the projection image, and
   projects the second image on the projection surface by using the second image signal, and
   the first projector
   acquires a first image signal representing the first image from the projection image signal based on first area information representing an area of the projection image that is an area occupied by the first image,
   projects the first image on the projection surface by using the first image signal, and
   controls the output of the sound from the first projector based on the position information, the position of the first focusing lens, and the first area information.

5. A display system comprising:
   a first projector; and a second projector,
   wherein the first projector includes
   a first focusing lens,
   a first projection section that projects a first image on a projection surface via the first focusing lens,
   a first loudspeaker that outputs sound based on a sound signal, and
   a first setting section that sets a position of the first focusing lens based on a focused state of the first image on the projection surface,
   the second projector includes
   a second focusing lens,
   a second projection section that projects a second image on the projection surface via the second focusing lens,
   a second loudspeaker that outputs sound based on the sound signal,
   a second setting section that sets a position of the second focusing lens based on a focused state of the second image on the projection surface, and
   a transmitter that transmits position information on the position of the second focusing lens,
   the first projector further includes
   a receiver that receives the position information, and a sound control section that controls the output of the sound from the first loudspeaker based on the position information and the position of the first focusing lens, and the first projector controls the output of the sound from the first projector based on a relationship between a first distance that is a distance between the projection surface and the first projector and is estimated based on the position of the first focusing lens, and a second distance that is a distance between the projection surface and the second projector and is estimated based on the position information.

6. A sound output controlling method performed by a display apparatus that projects a first image on a projection surface via a first focusing lens and outputs sound based on a sound signal, the method comprising:

receiving, from another display apparatus that projects a second image on the projection surface via a second focusing lens and outputs sound based on the sound signal, position information on a position of the second focusing lens set based on a focused state of the second image on the projection surface;

setting a position of the first focusing lens based on a focused state of the first image on the projection surface; and controlling the output of the sound from the display apparatus based on the position information and the position of the first focusing lens, wherein the first projector controls the output of the sound from the first projector based on a relationship between a first distance that is a distance between the projection surface and the first projector and is estimated based on the position of the first focusing lens, and a second distance that is a distance between the projection surface and the second projector and is estimated based on the position information.

* * * * *